Sept. 30, 1924.  
E. W. ZEH  
1,509,857  
LOCK FOR CLUTCH STRIKING PINS AND THE LIKE  
Filed Dec. 4, 1920
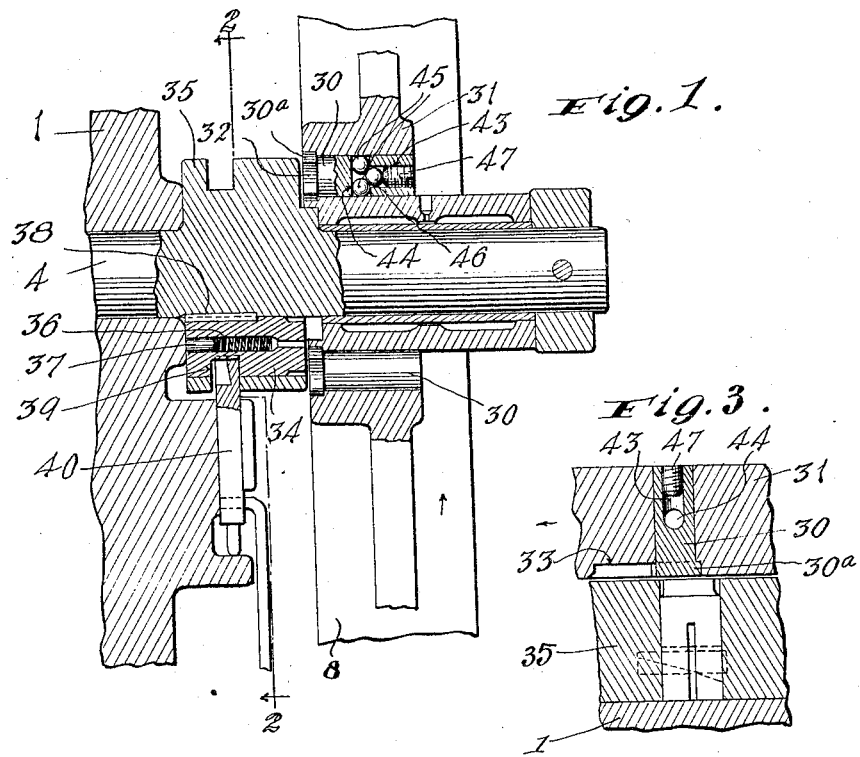
Fig.1.
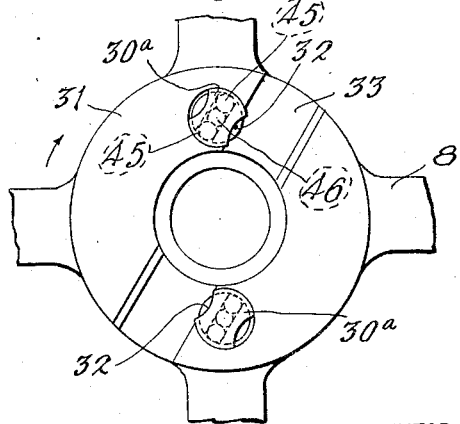
Fig.3.
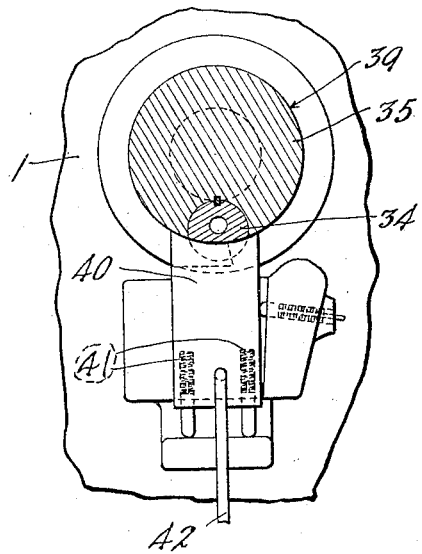
Fig.2.
Fig.4.
INVENTOR.  
Edmund W. Zeh,  
BY  
Everett H. Rook, ATTORNEYS.

Patented Sept. 30, 1924.

1,509,857

UNITED STATES PATENT OFFICE.

EDMUND W. ZEH, OF NEWARK, NEW JERSEY.

LOCK FOR CLUTCH STRIKING PINS AND THE LIKE.

Application filed December 4, 1920. Serial No. 428,405.

*To all whom it may concern:*

Be it known that I, EDMUND W. ZEH, a citizen of the United States, and a resident of Newark, in the county of Essex and State of New Jersey, have invented new and useful Improvements in Locks for Clutch Striking Pins and the like, of which the following is a specification.

This invention relates to lock means for holding a pin against longitudinal removal from a socket which said pin fits laterally, and for purposes of illustration I have shown the invention applied to the striking-pin of a power press clutch of common and well-known type, it being understood that the invention is not restricted to that particular use.

The objects of the invention are to provide improved means for firmly and securely holding such a pin against longitudinal movement while in use and yet enabling it to be quickly and simply released for removal and replacement, when desired, and to obtain other advantages.

Referring to the accompanying drawings, in which like numerals of reference indicate the same parts throughout the several views, Figure 1 is a sectional view of a clutch mechanism to which I have shown my invention applied;

Figure 2 is a sectional view on line 2—2 of Fig. 1, looking in the direction indicated by the arrows;

Figure 3 is a view of the clutch end of the hub of the driving pulley, and

Figure 4 is an approximately horizontal detail section showing a striking pin of the driving pulley as passing the clutch pin after disengagement of the latter.

In said drawings, reference numeral 1 indicates one side piece or housing of the frame of a press in which is journaled a shaft 4, the rotation of which is adapted to reciprocate a hammer, not shown. The shaft 4 has a driving pulley 8 upon one end of itself outside the frame of the press, and clutch means is provided between the driving pulley 8 and shaft 4 so that while said driving pulley normally turns loose on the shaft and continuously, the operator can at will cause the shaft to turn with the pulley for one revolution. A common form of such clutch means comprises what is called a striking pin in the driving pulley which is engaged as desired by a clutch pin carried by the shaft, and a feature of the present invention is to improve said striking pin so that it can be firmly and solidly held in its seat in the driving pulley and yet easily and quickly released when desired. This striking pin, which is designated by reference numeral 30, extends through the hub 31 of the driving pulley parallel to the shaft 4 and preferably has its head 30$^a$ flush with the end of the hub next the side-piece 1 of the press, the striking edge 32 of said head having a curved seat to receive the clutch pin and said seat being exposed by a radial depression 33 in the end of the hub of the driving pulley, see Figures 3 and 4. Preferably there are two or more of these striking pins symmetrically disposed, so as to distribute the wear and secure a quick engagement when the clutch pin is projected into the depression 33.

The present invention has no relation to the clutch pin or its operation and any mechanism can be employed for operating it, but for purposes of illustration I have shown a clutch pin 34 slidably mounted in an annular enlargement 35 on the shaft 4 between the driving pulley and side-piece 1; said clutch pin is normally projected into the depression 33 by a spring 36 within itself tending to project a plunger 37 against the side-piece 1, and a key 38 prevents turning of the clutch pin. The annular extension 35 has in its circumference an annular groove 39 which cuts partly through the clutch pin 34, registering therewith when the clutch pin is retracted and exposing a shoulder of the clutch pin when said pin is projected. A latch 40 is mounted on the side-piece 1, beneath the shaft 4, and has its upper end adapted to enter the groove 39 and tapered or thinned at one edge to enter beneath the shoulder of the clutch pin and retract it, said latch being normally forced upward by suitable springs 41 and adapted to be retracted by a draft rod 42. As is well understood, when said latch is retracted by the press operator, the clutch pin 34 springs into a depression 33 of the driving pulley, is engaged by a striking pin 30 and the shaft 4 is revolved for one complete revolution or until the clutch pin again engages the latch 40 and is retracted.

Obviously the impact of the striking pins 29 against the clutch pin wears them, so that it is necessary at times to remove and replace them, and in order to hold said striking pins securely in place and yet enable them to be removed quickly and easily I have provided the following means. Each striking pin is drilled axially from its end away from its head, and communicating with the passage 43 thus formed is a corresponding transverse passage 44 drilled at about the middle of the pin. The passages are of such diameter that opposite members 45, 45 in the transverse passage 44 may be wedged apart by a third member 46 in the longitudinal passage 43, all as shown in Figure 1 of the drawing. A clamping screw 47 is threaded into the outer end of the passage 43, and by tightening this against the spreading member 46, great pressure can be exerted to force the members 45, 45 apart and into engagement with the side walls of the socket or seat for the striking pin 30 in the hub of the driving pulley. This holds the striking pin firmly and solidly in its place, and at the same time by loosening the clamping screw 47 the striking pin can be easily and readily removed. Said screw 47 is capable of passing through the seat or socket in the driving pulley for the striking pin 30, without removal from the longitudinal passage 43 into which it is threaded, as is clearly shown in the drawing, and therefore the pin can be removed from its said socket without removing the screw from the pin.

It will be understood that the striking pin 30 fits its socket in the hub 21 so that the wall of said socket takes the lateral strain in operation, and the members 45 engaging said wall as described prevent any longitudinal movement of the pin, so that the striking pin is held firmly and solidly in position, notwithstanding the great strain upon it, and yet is quickly and easily removable when a new one is needed.

I have shown the members 45, 45 in the transverse passage and the spreading member 46 in the longitudinal passage, as all balls, but obviously they could be of other forms without departing from the spirit and scope of my invention, and I do not wish to be understood as limiting myself in that or any other respect except as required by the following claims when construed in the light of the prior art.

Having thus described the invention, what I claim is:

1. The combination with a part having a socket, of a removable pin fitting said socket laterally and having a transverse passage opening through its side within said socket and a longitudinal passage communicating with said transverse passage and opening through one end of the pin, a locking member movable longitudinally of said transverse passage and adapted to engage the wall of the socket, and means for holding said locking member in engagement with the wall of the socket to prevent withdrawal of the pin longitudinally, said means including a screw in said longitudinal passage capable of passing through the said socket for the pin, whereby the pin may be removed from its socket without removing the screw from the pin.

2. The combination with a part having a socket open at both ends, of a removable pin fitting said socket laterally and having a transverse passage opening through its sides within said socket and a longitudinal passage communicating with said transverse passage and opening through the end of the pin adapted to enter first in inserting the pin into the socket, a locking member movable longitudinally of said transverse passage to engage the wall of the socket, and means for forcing said locking member into engagement with the wall of the socket to prevent withdrawal of the pin longitudinally, said means including a screw in said longitudinal passage capable of passing through the said socket for the pin, whereby the pin may be removed from its socket without removing the screw from the pin.

3. The combination with a part having a socket open at both ends, of a removable headed pin fitting said socket laterally and having a transverse passage opening through its side within said socket and a longitudinal passage communicating with said transverse passage and opening through the end of the pin away from its head, a locking member movable longitudinally of said transverse passage to engage the wall of the socket, and means for forcing said locking member into engagement with the wall of the socket to prevent withdrawal of the pin longitudinally, said means including a screw in said longitudinal passage capable of passing through the said socket for the pin, whereby the pin may be removed from its socket without removing the screw from the pin.

EDMUND W. ZEH.